(12) United States Patent
Ishii et al.

(10) Patent No.: US 11,566,666 B2
(45) Date of Patent: Jan. 31, 2023

(54) PROCESSING MACHINE AND PRESSURE ADJUSTMENT METHOD (71) Applicant: FANUC CORPORATION, Yamanashi (JP)

(72) Inventors: Yuuta Ishii, Yamanashi-ken (JP); Hiroshi Minami, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 416 days.

(21) Appl. No.: 16/820,257

(22) Filed: Mar. 16, 2020

(65) Prior Publication Data
US 2020/0300296 A1 Sep. 24, 2020

(30) Foreign Application Priority Data

Mar. 20, 2019 (JP) .............................. JP2019-053256
Sep. 13, 2019 (JP) .............................. JP2019-167085

(51) Int. Cl.
F16C 32/06 (2006.01)
H02P 7/00 (2016.01)
G05D 16/08 (2006.01)
G05D 13/30 (2006.01)
H02P 29/68 (2016.01)
G05D 13/00 (2006.01)
B23Q 1/38 (2006.01)

(52) U.S. Cl.
CPC ............ F16C 32/0644 (2013.01); B23Q 1/38 (2013.01); F16C 32/0603 (2013.01); G05D 13/00 (2013.01); G05D 13/30 (2013.01); G05D 16/08 (2013.01); H02P 7/00 (2013.01); H02P 29/68 (2016.02)

(58) Field of Classification Search
CPC ....... F16C 32/0644; B23Q 1/38; G05D 13/30; H02P 7/00; H02P 29/68
See application file for complete search history.

(56) References Cited

U.S. PATENT DOCUMENTS 5,348,448 A * 9/1994 Ikemoto .............. F04C 29/0085
417/42
6,748,739 B1 * 6/2004 Hirano .................... F04B 49/06
60/431
2007/0110347 A1 * 5/2007 Sato .................... F16C 32/0603
384/100

FOREIGN PATENT DOCUMENTS

| CN | 106984836 A | 7/2017 |
| JP | S62225495 A | 10/1987 |
| JP | H09210063 A | 8/1997 |
| JP | 2001099157 A | 4/2001 |
| JP | 2001132748 A | 5/2001 |
| JP | 2008057611 A | 3/2008 |
| JP | 2012031789 A | 2/2012 |
| JP | 2018-025253 A | 2/2018 |

* cited by examiner

Primary Examiner — Bickey Dhakal
(74) Attorney, Agent, or Firm — Robert P. Michal, Esq.; Carter, DeLuca & Farrell LLP (57) ABSTRACT A processing machine includes: a static pressure bearing configured to support a drive shaft; a fluid feeder configured to output a fluid to be supplied to the static pressure bearing, in accordance with rotation of a servomotor; a sensor configured to detect a physical quantity of the fluid output from the fluid feeder; and a control unit configured to control the rotation speed of the servomotor according to the physical quantity of the fluid.

11 Claims, 6 Drawing Sheets

PROCESSING MACHINE AND PRESSURE ADJUSTMENT METHOD

CROSS-REFERENCE TO RELATED APPLICATIONS

This application is based upon and claims the benefit of priority from Japanese Patent Applications No. 2019-053256 filed on Mar. 20, 2019 and No. 2019-167085 filed on Sep. 13, 2019, the contents all of which are incorporated herein by reference.

BACKGROUND OF THE INVENTION

Field of the Invention

The present invention relates to a processing machine in which the pressure of a fluid to be supplied to a static pressure bearing for supporting a drive shaft is adjusted, as well as relating to a pressure adjustment method.

Description of the Related Art

In a processing machine, a drive shaft may be floated and supported by a fluid. In this case, the drive shaft is supported by a static pressure bearing. Japanese Laid-Open Patent Publication No. 2018-025253 discloses a fluid control system for supplying a fluid to a static pressure bearing so that the pressure of the fluid supplied to the static pressure bearing is kept constant.

SUMMARY OF THE INVENTION

However, there are cases in which the state of the fluid that floats the drive shaft changes due to heat generation of the motor for driving the drive shaft and environment change around the drive shaft. As the state of the fluid changes even slightly, the distance between the shaft and the static pressure bearing changes accordingly, so that processing accuracy tends to be unstable. This tendency is likely to be obvious particularly when a workpiece is machined based on a command containing the machining accuracy of 100 nm or less, given by a machining program.

It is therefore an object of the present invention to provide a processing machine and a pressure adjustment method capable of suppressing instability of machining accuracy (processing accuracy) due to a state change of a fluid.

A first aspect of the present invention resides in a processing machine for machining an object to be machined, including: a static pressure bearing configured to support a drive shaft; a fluid feeder configured to output a fluid to be supplied to the static pressure bearing, in accordance with rotation of a servomotor; a sensor configured to detect a physical quantity of the fluid output from the fluid feeder; and a control unit configured to control the rotation speed of the servomotor according to the physical quantity of the fluid.

A second aspect of the present invention is a pressure adjustment method for a processing machine having a fluid feeder configured to output a fluid to be supplied to a static pressure bearing configured to support a drive shaft, in accordance with rotation of a servomotor, and the method includes: an acquisition step of acquiring a physical quantity of the fluid output from the fluid feeder; and a control step of controlling the rotation speed of the servomotor according to the physical quantity of the fluid acquired at the acquisition step.

According to the present invention, even when the physical quantity of the fluid output from the fluid feeder changes, a suitable output amount of fluid corresponding to the physical quantity is supplied from the fluid feeder to the static pressure bearing. It is therefore possible to suppress the instability of processing accuracy caused by a state change of the fluid.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing preferred embodiments with reference to the accompanying drawings.

EMBODIMENT

First Embodiment

Figure 1:
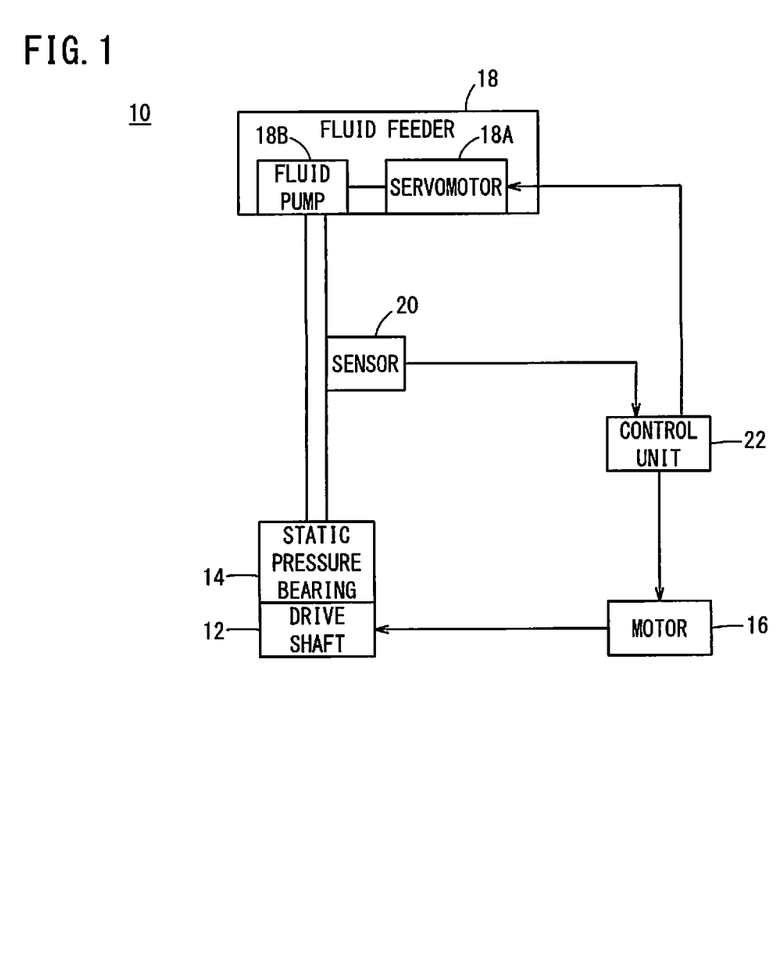
FIG. 1 is a schematic diagram showing a configuration of a processing machine.

FIG. 1 is a schematic diagram showing a configuration of a processing machine 10. The processing machine 10 processes or machines a workpiece with a tool. Here, the processing machine 10 may be a precision processing machine that machines a workpiece following a command that contains machining accuracy of 100 nm or below, specified by a machining program. Further, the processing machine 10 may be a precision processing machine that machines a workpiece following a command that contains machining accuracy of 10 nm or below, specified by a machining program. The processing machine 10 includes a drive shaft 12, a static pressure bearing 14, a motor 16, a fluid feeder 18, a sensor 20, and a control unit 22.

The static pressure bearing 14 movably supports the drive shaft 12. The static pressure bearing 14 leads a supplied fluid to the drive shaft 12 so as to float and support the drive shaft 12 in a movable manner.

The motor 16 is configured to drive the drive shaft 12. This motor 16 may be a spindle motor that drives and rotates the drive shaft 12, or may be a servomotor or a linear motor that drives the drive shaft 12 linearly. When the motor 16 is a spindle motor, the drive shaft 12 is a spindle, and when the motor 16 is a servomotor or a linear motor, the drive shaft 12 is a feed shaft.

The fluid feeder 18 includes a servomotor 18A and a fluid pump 18B, and feeds a fluid to be supplied to the static pressure bearing 14 in accordance with rotation of the servomotor 18A. Examples of the fluid include a gas such as air and nitrogen, and a liquid such as oil.

The fluid pump 18B outputs the fluid to the outside by giving the fluid energy in accordance with the rotation speed of the servomotor 18A. The output amount (flow rate or fluid pressure) of the fluid output from the fluid pump 18B to the outside increases as the rotation speed of the servomotor 18A increases. The fluid output from the fluid pump 18B is supplied to the static pressure bearing 14 through a flow channel connecting between the fluid pump 18B and the static pressure bearing 14.

The sensor 20 detects a physical quantity of the fluid output from the fluid feeder 18. In this embodiment, the sensor 20 is a temperature sensor that detects the temperature of the fluid. When detecting the temperature of the fluid, the sensor 20 outputs the detected fluid temperature to the control unit 22.

The control unit 22 controls the motor 16 and the servomotor 18A of the fluid feeder 18. The control unit 22 performs feedback control of the motor 16 so that the output value of electric current from an unillustrated current sensor coincides with a target value.

Figure 2:
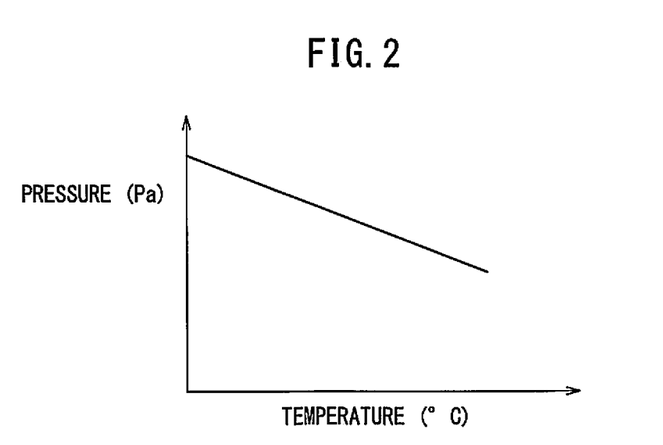
FIG. 2 is a diagram showing a relationship between the pressure and the temperature of a fluid.
Figure 3:
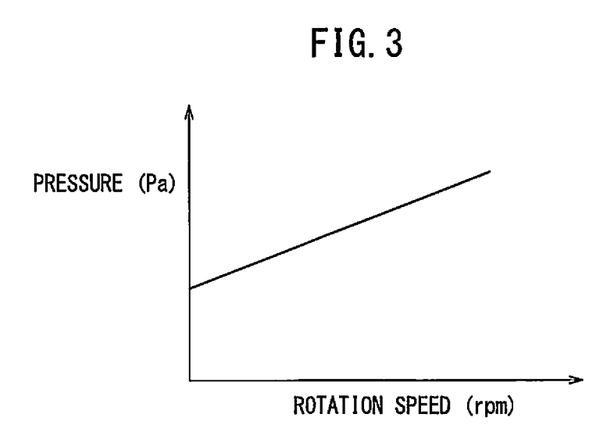
FIG. 3 is a diagram showing a relationship between the fluid pressure and the rotation speed of a servomotor.

As regards this, there occur cases where the pressure of the fluid floating the drive shaft 12 changes in response to the movement of the drive shaft 12 driven by the motor 16, heat generation from the fluid feeder 18, and/or change in the surrounding environment. Specifically, as shown in FIG. 2, as the fluid temperature increases, the fluid pressure decreases. On the other hand, as shown in FIG. 3, when the rotation speed of the servomotor 18A of the fluid feeder 18 is raised, the fluid pressure increases.

As such, the control unit 22 controls the rotation speed of the servomotor 18A of the fluid feeder 18 according to the fluid temperature output from the sensor 20. Specifically, the control unit 22 drives the servomotor 18A so that the higher the temperature of the fluid, the higher the rotation speed of the servomotor 18A.

Thus, the output amount (flow rate or pressure) of the fluid output from the fluid pump 18B to the outside is varied. That is, when the temperature detected by the sensor 20 becomes relatively high, the output amount (flow rate or flow pressure) of the fluid from the fluid pump 18B is increased, and when the temperature becomes relatively low, the output amount (flow rate or flow pressure) of the fluid from the fluid pump 18B is decreased. Therefore, even if the temperature of the fluid output from the fluid feeder 18 changes, a suitable output amount of fluid corresponding to the temperature can be supplied to the static pressure bearing 14.

Figure 4:
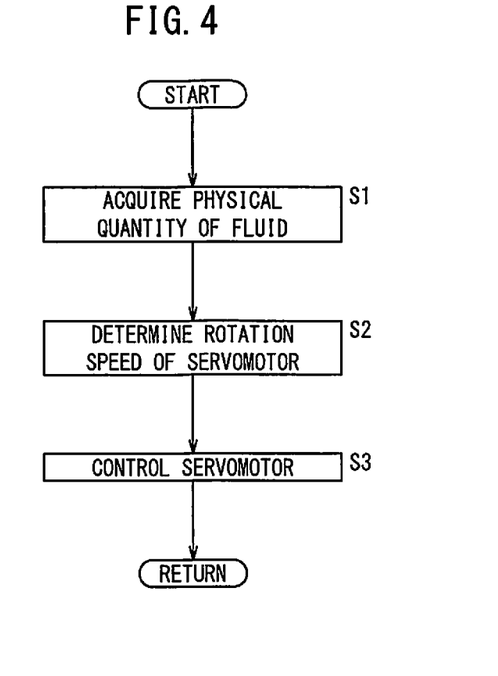
FIG. 4 is a flowchart illustrating a flow of a pressure adjustment process performed by a control unit.

Next, a pressure adjustment method of adjusting the pressure of the fluid will be described. FIG. 4 is a flowchart showing the flow of a pressure adjustment process by the control unit 22.

At step S1, the control unit 22 acquires the temperature as a physical quantity of the fluid from the sensor 20, and then the control proceeds to step S2, at which the rotation speed of the servomotor 18A is determined according to the acquired temperature.

The control unit 22 may refer to a table that associates the fluid temperature with the rotation speed of the servomotor 18A, to thereby determine the rotation speed of the servomotor 18A. Alternatively, the control unit 22 may calculate the rotation speed of the servomotor 18A by using a relational formula that associates the fluid temperature with the rotation speed of the servomotor 18A.

The control unit 22 determines the rotation speed of the servomotor 18A corresponding to the temperature acquired at step S1, and then the control proceeds to step S3. At step S3, the control unit 22 controls the servomotor 18A of the fluid feeder 18 so that the rotation speed of the servomotor 18A coincides with the value determined at step S2, and the control returns to step S1.

Thus, the control unit 22 controls the servomotor 18A of the fluid feeder 18 according to the temperature of the fluid output from the fluid feeder 18, whereby even if the fluid temperature changes, it is possible to supply a suitable output amount of fluid corresponding to the temperature, from the fluid feeder 18 to the static pressure bearing 14. Therefore, it is possible to suppress the instability of machining accuracy caused by a state change of the fluid.

Second Embodiment

This embodiment differs in the type of the sensor 20 from the first embodiment. Specifically, in the first embodiment the sensor 20 is a temperature sensor that detects the temperature of the fluid, whereas the sensor 20 is a pressure sensor that detects the pressure of the fluid in the second embodiment.

In the present embodiment, a part of the control content of the control unit 22 is different from that of the first embodiment. Specifically, in the first embodiment the control unit 22 controls the rotation speed of the servomotor 18A of the fluid feeder 18 according to the fluid temperature, whereas the control unit 22 controls the rotation speed of the servomotor 18A of the fluid feeder 18 according to the fluid pressure in the present embodiment.

That is, the control unit 22 acquires the fluid pressure from the sensor 20 (step S1), and determines the rotation speed of the servomotor 18A such that the higher the acquired pressure, the lower the rotation speed of the servomotor 18A (step S2). The control unit 22 may determine the rotation speed of the servomotor 18A by reference to a table that associates the fluid pressure with the rotation speed of the servomotor 18A or by calculating the rotation speed of the servomotor 18A using a relational formula that associates the fluid pressure with the rotation speed of the servomotor 18A.

The control unit 22 determines the rotation speed of the servomotor 18A, and then the control unit 22 performs feedback control of the servomotor 18A of the fluid feeder 18 such that the determined rotation speed coincides with a target value (step S3).

With this configuration, when the pressure detected by the sensor 20 becomes relatively high, the output amount (flow rate or flow pressure) of the fluid from the fluid pump 18B is decreased, and when the pressure becomes relatively low, the output amount (flow rate or flow pressure) of the fluid from the fluid pump 18B is increased. Therefore, even if the pressure of the fluid output from the fluid feeder 18 changes, a suitable output amount of fluid corresponding to the pressure is supplied to the static pressure bearing 14.

Thus, the control unit 22 controls the servomotor 18A of the fluid feeder 18 according to the pressure of the fluid output from the fluid feeder 18, whereby it is possible to suppress the instability of processing accuracy (machining accuracy) caused by a state change of the fluid, as in the first embodiment.

In this embodiment, the sensor 20 is a pressure sensor, but may be a flow rate sensor. When the sensor 20 is a flow rate sensor, the control unit 22 controls the rotation speed of the servomotor 18A of the fluid feeder 18 according to the flow rate of the fluid.

That is, the control unit 22 acquires the flow rate of the fluid from the sensor 20 (step S1), and determines the rotation speed of the servomotor 18A such that the higher the acquired flow rate, the lower the rotation speed of the servomotor 18A (step S2). Then, the control unit 22 performs feedback control of the servomotor 18A of the fluid feeder 18 such that the determined rotation speed coincides with a target value (step S3).

Thus, even if the sensor 20 is a flow rate sensor, it is possible to suppress instability in processing accuracy due to a state change of the fluid, as in the present embodiment.

(Modifications)

Though the above embodiment has been described as examples of the present invention, the technical scope of the invention should not be limited to the above embodiments. It goes without saying that various modifications and improvements can be added to the above embodiments. It is also apparent from the scope of claims that the embodiments added with such modifications and improvements should be incorporated in the technical scope of the invention.

(Modification 1)

The control unit 22 controls the rotation speed of the servomotor 18A in accordance with the fluid temperature in the first embodiment. In the second embodiment, the control unit 22 controls the rotation speed of servomotor 18A in accordance with the pressure or flow rate of the fluid. However, the control unit 22 may control the rotation speed of the servomotor 18A according to a physical quantity other than the temperature, pressure or flow rate.

(Modification 2)

The control unit 22 controls the rotation speed of the servomotor 18A in accordance with the fluid temperature in the first embodiment. In the second embodiment, the control unit 22 controls the rotation speed of servomotor 18A in accordance with the pressure or flow rate of the fluid. However, the control unit 22 may control the rotation speed of the servomotor 18A according to the temperature and the pressure of the fluid, or may control the rotation speed of the servomotor 18A according to the temperature and the flow rate of the fluid.

For example, the control unit 22 acquires the fluid temperature from the temperature sensor and acquires the pressure (or the flow rate) from the pressure sensor (or the flow rate sensor) (Step S1). The control unit 22 determines the rotation speed of the servomotor 18A so that the rotation speed of the servomotor 18A becomes lower as the acquired pressure (or flow rate) is higher, and compensates the determined rotation speed of the servomotor 18A so that the rotation speed of the servomotor 18A becomes higher as the acquired temperature is higher (step S2). The control unit 22 performs feedback control of the servomotor 18A so that the compensated rotation speed coincides with a target value (Step S3).

The control unit 22 may determine the rotation speed of the servomotor 18A according to the pressure (or flow rate) acquired from the pressure sensor (or the flow rate sensor), and compensate the target value so that the higher the temperature obtained from the temperature sensor, the higher the rotation speed of the servomotor 18A (step S2). In this case, the control unit 22 performs feedback control of the servomotor 18A so that the determined rotation speed coincides with the compensated target value (step S3).

Thus, when the rotation speed of the servomotor 18A is controlled in accordance with the temperature and pressure (or flow rate) of the fluid, it is possible to further suppress the instability of processing accuracy caused by a state change of the fluid, as compared to the case where the rotation speed is controlled based on a single physical quantity of the fluid.

Also, the control unit 22 may control the rotation speed of the servomotor 18A according to the pressure and flow rate of the fluid, or may control the rotation speed of the servomotor 18A according to the temperature, pressure and flow rate of the fluid. In these cases also, the instability of processing accuracy due to a state change of the fluid can be further suppressed as compared to the case where the rotation speed of the servomotor 18A is controlled based on a single physical quantity of the fluid.

(Modification 3)

Figure 5:
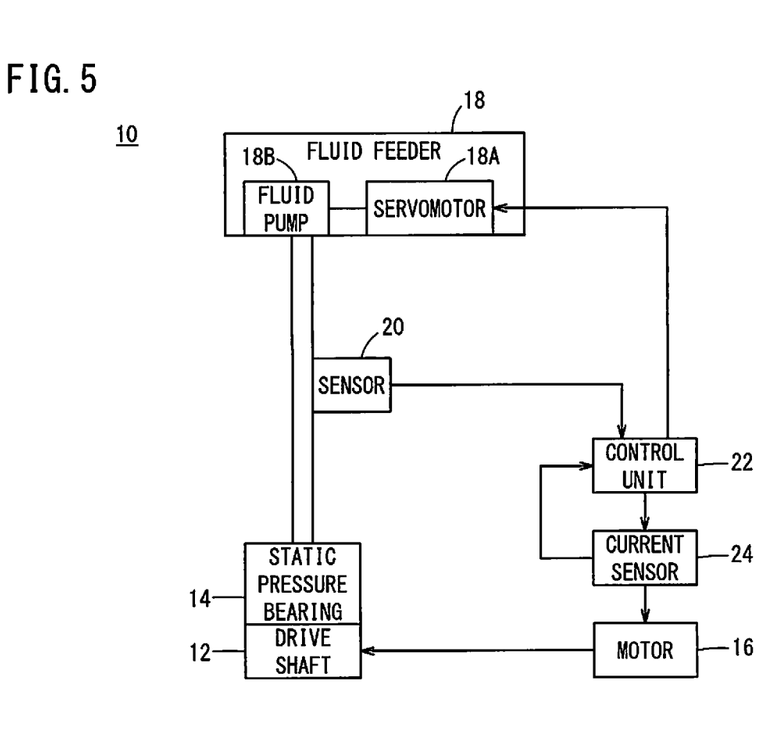
FIG. 5 is a diagram showing a processing machine of Modification 3.

FIG. 5 is a view showing a processing machine 10 according to Modification 3. The same components as those of the above embodiments are allotted with the same reference numerals, and repeated description as that of the above-described first embodiment is omitted.

The processing machine 10 of Modification 3 is different from the above embodiment in that a current sensor 24 is added. The current sensor 24 detects the value of electric current supplied from the control unit 22 to the motor 16 in order to drive the motor 16, and outputs the detected current value to the control unit 22.

There are cases where the gap between the drive shaft 12 and the static pressure bearing 14 becomes narrowed due to, for example, an increase in the load applied to the table on which a workpiece is placed. In this case, the resistance between the drive shaft 12 and the static pressure bearing 14 increases, so that the value of current required to drive the motor 16 increases.

To deal with this situation, in this modification, the rotation speed of the servomotor 18A is controlled based on the value of current supplied to the motor 16 (the current value detected by the current sensor 24) and the physical quantity of the fluid output from the fluid feeder 18 (the physical quantity of the fluid detected by the sensor 20). Examples of the physical quantity of the fluid may include temperature, pressure, flow rate and the like. In this modification, the physical quantity of the fluid is temperature.

For example, the control unit 22 acquires the temperature of the fluid from the sensor 20 and the value of current from the current sensor 24 (Step S1). The control unit 22 determines the rotation speed of the servomotor 18A so that the rotation speed of the servomotor 18A increases as the obtained value of current is higher, and compensates the determined rotation speed such that the rotation speed of the servomotor 18A becomes greater as the acquired temperature is higher (step S2). The control unit 22 controls the servomotor 18A so as to rotate at the compensated rotation speed (Step S3).

As described above, controlling the rotation speed of the servomotor 18A based on the value of current supplied to the motor 16 and the physical quantity of the fluid output from the fluid feeder 18, makes it possible to further suppress the instability of processing accuracy due to a state change of the fluid, as compared to a case of controlling the rotation speed based only on the physical quantities of the fluid.

(Modification 4)

Figure 6:
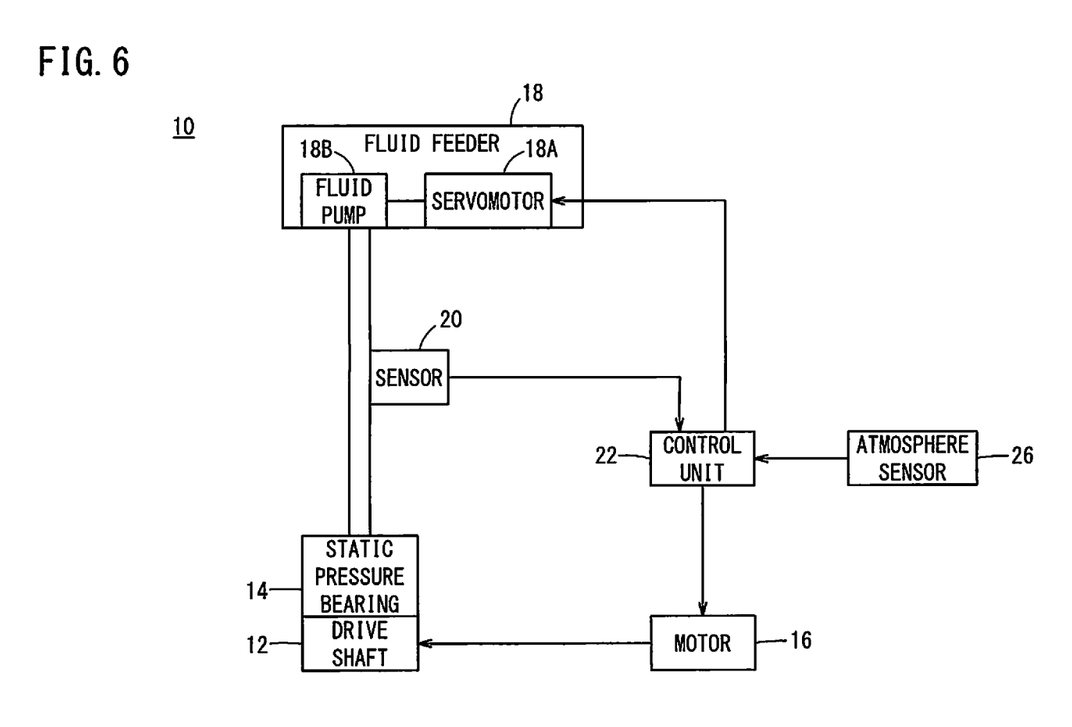
FIG. 6 is a diagram showing a processing machine of Modification 4.

FIG. 6 is a view showing a processing machine 10 according to Modification 4. The same components as those of the above embodiments are allotted with the same reference numerals, and repeated description as that of the above first embodiment is omitted.

The processing machine 10 of Modification 4 is different from the above embodiment in that an atmosphere sensor 26 is additionally provided. The atmosphere sensor 26 detects a physical quantity of the atmosphere and outputs the detected physical quantity to the control unit 22. Examples of the physical quantity of the atmosphere include temperature and pressure.

Here, as described above, the pressure of the fluid that floats the drive shaft 12 may vary depending on change in environment. Specifically, for example, when the temperature of the atmosphere increases, the pressure of the fluid decreases, and when the temperature of the atmosphere decreases, the pressure of the fluid increases.

As such, in this Modification, based on the physical quantity of the atmosphere detected by the atmosphere sensor 26 and the physical quantity of the fluid detected by the sensor 20, the rotation speed of the servomotor 18A is controlled. For example, when the physical quantity of the atmosphere is temperature and the physical quantity of the fluid is pressure, the rotation speed of the servomotor 18A can be controlled in the same manner as in the case described above in Modification 2.

(Modification 5)

The above embodiments and modifications may be arbitrarily combined as long as no technical inconsistency occurs.

[Invention that can be Grasped from the Above]

Inventions that can be grasped from the above-described embodiments and modifications will be described below.

First Invention

The first invention is a processing machine (10) for machining an object to be machined. The processing machine (10) includes: a static pressure bearing (14) configured to support a drive shaft (12); a fluid feeder (18) configured to output a fluid to be supplied to the static pressure bearing (14), in accordance with rotation of a servomotor (18A); a sensor (20) configured to detect a physical quantity of the fluid output from the fluid feeder (18); and a control unit (22) configured to control the rotation speed of the servomotor (18A) according to the physical quantity of the fluid.

Thus, even if the physical quantity of the fluid output from the fluid feeder (18) changes, a suitable output amount of fluid corresponding to the physical quantity is supplied from the fluid feeder (18) to the static pressure bearing (14), so that it is possible to suppress the instability of processing accuracy caused by a state change of the fluid.

The physical quantity may include at least one of pressure, flow rate and temperature. This enables the fluid feeder (18) to supply the static pressure bearing (14) with a suitable output amount of fluid corresponding to change in at least one of the pressure, the flow rate and the temperature.

The processing machine (10) may further include a motor (16) configured to drive the drive shaft (12), and the control unit (22) may be configured to control the rotation speed of the servomotor (18A) based on the value of electric current supplied to the motor (16) and the physical quantity of the fluid. This makes it possible to further suppress the instability of processing accuracy due to a state change of the fluid, as compared to a case where the rotation speed of the servomotor (18A) is controlled only based on the physical quantity of the fluid.

The processing machine (10) may further include an atmosphere sensor (26) configured to detect a physical quantity of the atmosphere around the processing machine (10), and the control unit (22) may be configured to control the rotation speed of the servomotor (18A) based on the physical quantity of the atmosphere and the physical quantity of the fluid. This makes it possible to further suppress the instability of processing accuracy caused by a state change of the fluid, as compared to a case where the rotation speed of the servomotor (18A) is controlled only based on the physical quantity of the fluid.

Second Invention

The second invention is a pressure adjustment method for a processing machine (10) having a fluid feeder (18) that outputs a fluid to be supplied to a static pressure bearing (14) for supporting a drive shaft (12), in accordance with rotation of a servomotor (18A), and the method includes: an acquisition step (S1) of acquiring a physical quantity of the fluid output from the fluid feeder (18); and a control step (S3) of controlling the rotation speed of the servomotor (18A) according to the physical quantity of the fluid acquired at the acquisition step (S1).

Thus, even if the physical quantity of the fluid output from the fluid feeder (18) changes, a suitable output amount of fluid in accordance with the physical quantity is supplied from the fluid feeder (18) to the static pressure bearing (14), so that it is possible to suppress the instability of processing accuracy due to a state change of the fluid.

The physical quantity may include at least one of pressure, flow rate and temperature. This enables the fluid feeder (18) to supply the static pressure bearing (14) with a suitable output amount of fluid corresponding to change in at least one of the pressure, the flow rate and the temperature.

The acquisition step (S1) may acquire the value of electric current supplied to a motor (16) for driving the drive shaft (12) and the physical quantity of the fluid, and the control step (S3) may control the rotation speed of the servomotor (18A) based on the value of the electric current and the physical quantity of the fluid. This makes it possible to further suppress the instability of processing accuracy due to a state change of the fluid, as compared to a case where the rotation speed of the servomotor (18A) is controlled only based on the physical quantity of the fluid.

The acquisition step (S1) may acquire a physical quantity of the atmosphere around the processing machine (10) and the physical quantity of the fluid, and the control step (S3) may control the rotation speed of the servomotor (18A) based on the physical quantity of the atmosphere and the physical quantity of the fluid. This makes it possible to further suppress the instability of processing accuracy caused by a state change of the fluid, as compared to a case where the rotation speed of the servomotor (18A) is controlled only based on the physical quantity of the fluid.

What is claimed is:

1. A processing machine for machining an object to be machined, comprising:
   a static pressure bearing configured to support a drive shaft;
   a fluid feeder configured to output a fluid to be supplied to the static pressure bearing, in accordance with rotation of a servomotor;
   a sensor configured to detect a physical quantity of the fluid output from the fluid feeder;
   an atmosphere sensor configured to detect a physical quantity of atmosphere around the processing machine; and
   a control unit configured to control a rotation speed of the servomotor according to the physical quantity of the fluid and the physical quantity of the atmosphere.

2. The processing machine according to claim 1, wherein the physical quantity includes at least one of pressure, flow rate or temperature.

3. The processing machine according to claim 1, further comprising a motor configured to drive the drive shaft, wherein the control unit is configured to control the rotation speed of the servomotor based on a value of electric current supplied to the motor, the physical quantity of the atmosphere, and the physical quantity of the fluid.

4. The processing machine according to claim 1, wherein the control unit is further configured to:
    acquire the rotation speed of the servomotor according to the physical quantity of the fluid;
    compensate the acquired rotation speed according to the physical quantity of the atmosphere; and
    control the servomotor so that the compensated rotation speed coincides with a target value.

5. The processing machine according to claim 1, wherein the control unit is further configured to:
    acquire the rotation speed of the servomotor according to the physical quantity of the fluid;
    compensate a target value according to the physical quantity of the atmosphere; and
    control the servomotor so that the acquired rotation speed coincides with the compensated target value.

6. The processing machine according to claim 1, wherein the drive shaft is supported and floated in the static pressure bearing by the fluid.

7. A pressure adjustment method for a processing machine having a fluid feeder configured to output a fluid to be supplied to a static pressure bearing configured to support a drive shaft, in accordance with rotation of a servomotor, comprising:
    an acquisition step of acquiring:
        a physical quantity of the fluid output from the fluid feeder; and
        a physical quantity of atmosphere around the processing machine; and
    a control step of controlling a rotation speed of the servomotor according to the physical quantity of the fluid acquired at the acquisition step and the physical quantity of the atmosphere acquired at the acquisition step.

8. The pressure adjustment method according to claim 7, wherein the physical quantity includes at least one of pressure, flow rate or temperature.

9. The pressure adjustment method according to claim 7, wherein:
    the acquisition step acquires a value of electric current supplied to a motor for driving the drive shaft and the physical quantity of the fluid; and
    the control step controls the rotation speed of the servomotor based on the value of the electric current, the physical quantity of the atmosphere, and the physical quantity of the fluid.

10. The pressure adjustment method according to claim 7, further comprising:
    acquiring the rotation speed of the servomotor according to the physical quantity of the fluid;
    compensating the acquired rotation speed according to the physical quantity of the atmosphere; and
    controlling the servomotor so that the compensated rotation speed coincides with a target value.

11. The pressure adjustment method according to claim 7, further comprising:
    acquiring the rotation speed of the servomotor according to the physical quantity of the fluid;
    compensating a target value according to the physical quantity of the atmosphere; and
    controlling the servomotor so that the acquired rotation speed coincides with the compensated target value.

* * * * *